Figure 1:
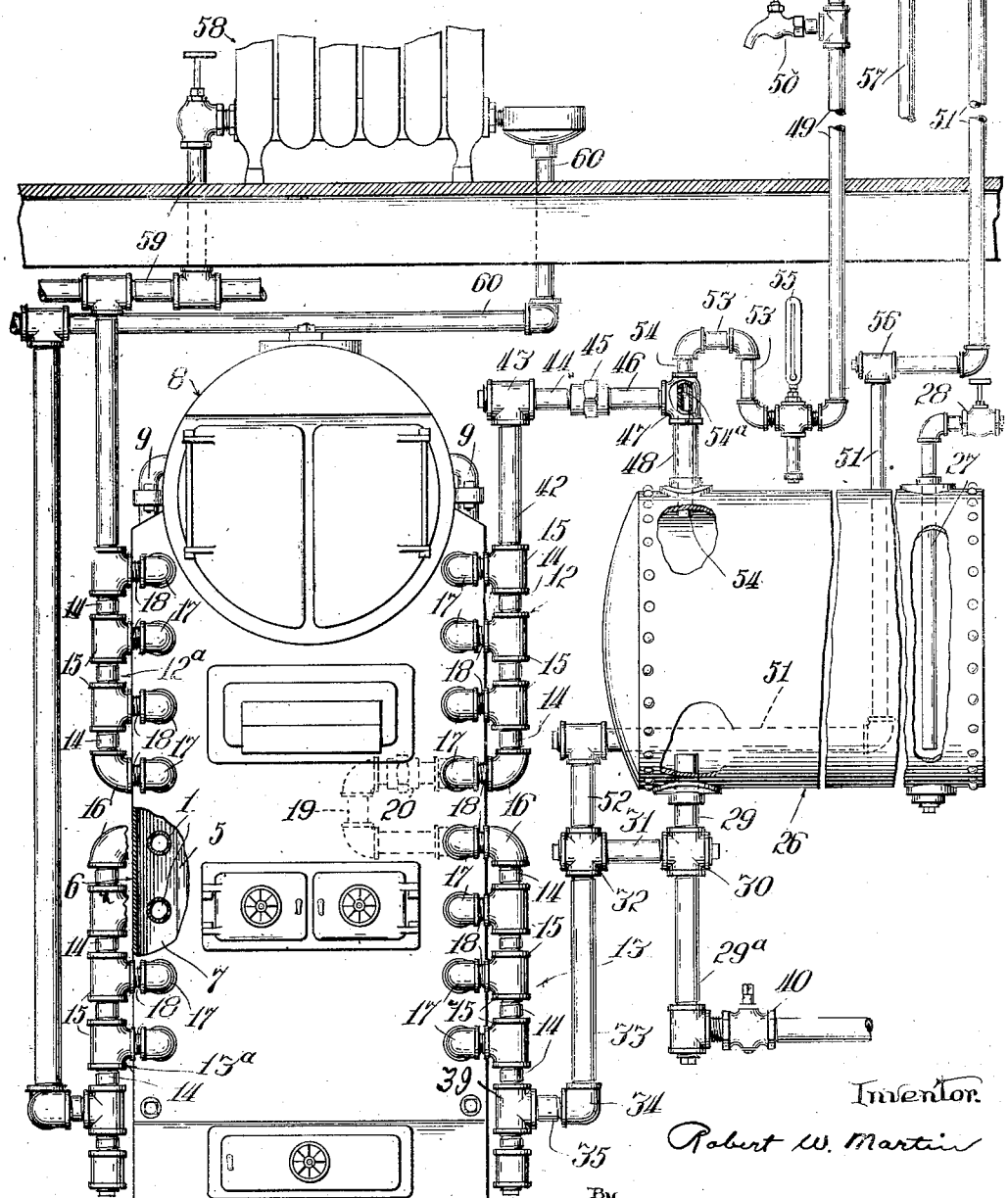

July 1, 1930. R. W. MARTIN 1,768,992
WATER HEATING APPARATUS
Filed Aug. 3, 1925 2 Sheets-Sheet 1

Inventor.
Robert W. Martin
By Leslie W. Fricke
Attorney.

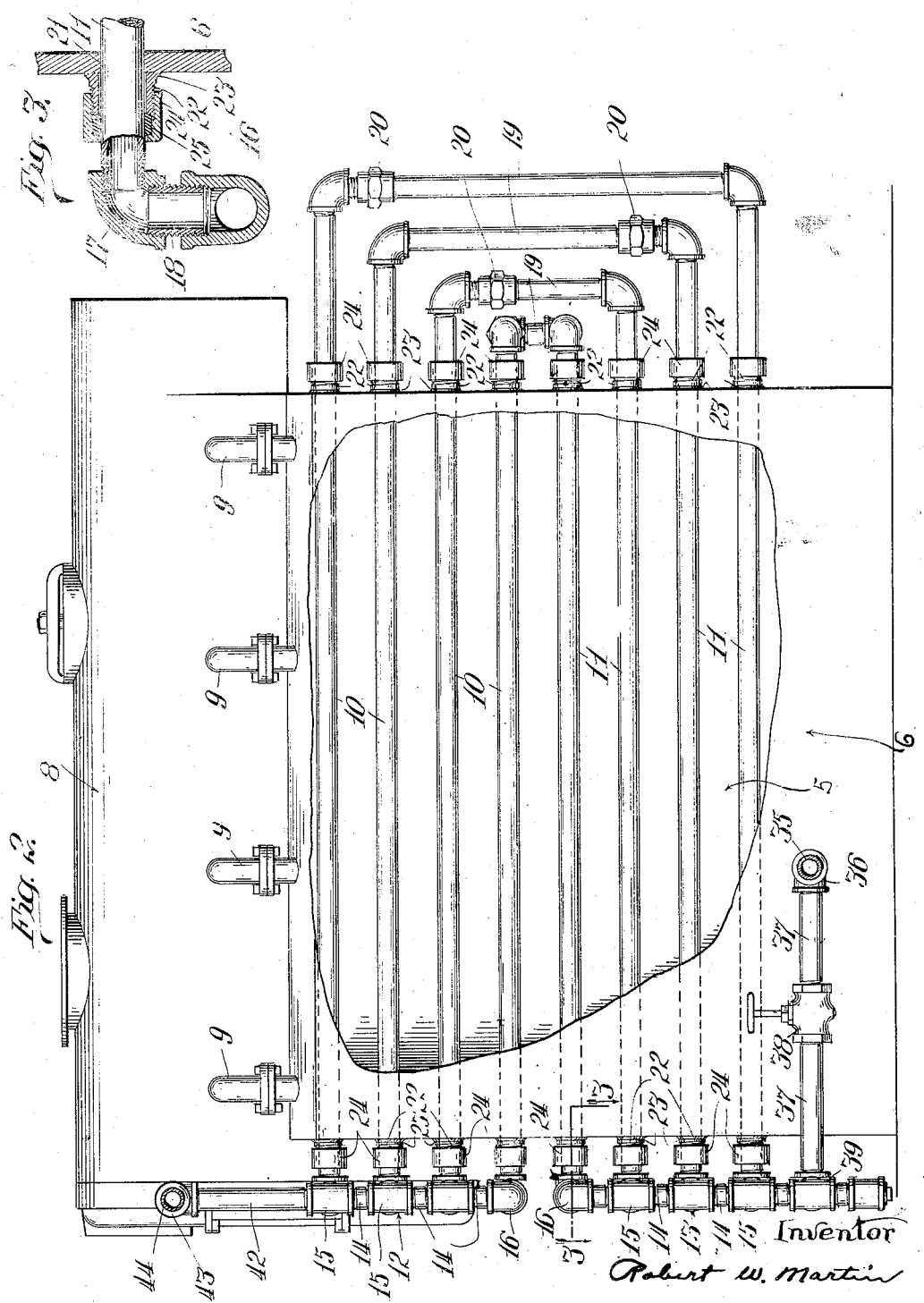

Patented July 1, 1930

1,768,992

UNITED STATES PATENT OFFICE

ROBERT W. MARTIN, OF CHICAGO, ILLINOIS, ASSIGNOR TO FERGUSON AND LANGE FOUNDRY COMPANY, OF CHICAGO, ILLINOIS, A CORPORATION OF ILLINOIS

WATER-HEATING APPARATUS

Application filed August 3, 1925. Serial No. 47,695.

My invention relates to water heating apparatus of the type which is adapted to be used in connection with a steam or hot water plant to furnish a separate supply of hot water.

In many cases, as for example, in homes, apartment buildings, hotels and the like, it is customary to supply hot water at wash bowls, sinks, bath rooms and the like, and in many factories, shops, and industrial plants it is necessary to supply heated water for various uses. In many such instances, it is desirable to heat the water for this hot water supply by means of the same plant which furnishes heat for the building or for power and thus avoid the use of a separate heater for the hot water supply. This is sometimes accomplished by introducing a coil, or a portion of the piping of the hot water supply system, into the fire-box of the heater of the building and causing the water to circulate therethrough. This, however, subjects the water at times to intense heat, burns out the coil or piping, causes alkaline deposits therein, and involves more or less trouble. Furthermore, the water is not maintained at a uniform temperature but varies quite suddenly with the condition of the fire in the fire-box. When the fire is low, sometimes the heat is not sufficient to cause the coil to function, and when the fire is particularly hot the coil becomes a genuine hazard in that steam is likely to be generated to such an extent as to cause a serious explosion.

In other cases, as for example where a hot water system is employed for heating the building, special devices have been employed which are inserted into the hot water compartment of the boiler and connected with the hot water supply system so that the water of said system circulates through the heating device in the boiler. In certain types of boilers, however, such heating devices cannot be conveniently and satisfactorily installed, and moreover it is desirable to avoid the use of special parts and to permit the water heating apparatus to be made up of standard fittings, and to insure ample hot water heating capacity in a limited space.

The principal objects of my invention are to provide a simple and efficient water heating apparatus for use in connection with steam or hot water plants which are used for heating buildings; to provide a water heater which may be advantageously employed in connection with certain types of heating plants having limited space for extra heater installation; to apply the heating apparatus in a compact manner; to afford a wide range of heating capacity in a restricted space; to utilize standard parts and avoid the necessity of providing special parts or fittings; to mount the heater in a convenient and substantial manner; and in general to afford a simple efficient, convenient and inexpensive heating system or apparatus for use in connection with steam and hot water plants such as are used for heating buildings.

The invention consists in the novel arrangements and constructions to be hereinafter described and claimed for carrying out the above stated objects and such other objects as will appear from the following description of a certain preferred embodiment illustrated in the accompanying drawings wherein, Fig. 1 is a view, somewhat diagrammatic, of a water heating apparatus embodying my invention and showing the front of a heater or boiler in connection with which my heating apparatus is used;

Fig. 2 is a side view of the heater having a portion of the side wall broken away and showing my water heating apparatus applied thereto; and Fig. 3 is a detail view showing the manner of mounting the tubes of my heating apparatus in the heater casing, being substantially a section on an enlarged scale taken at line 3—3 of Fig. 2.

In the drawings there is shown a boiler of the fire-box type wherein the combustion chamber has inner and outer walls 5 and 6, respectively, which are spaced apart to form a water leg having a space 7 in which the water for heating the building is subjected to the heat of the combustion chamber. These hollow walls usually extend entirely around the fire-box and well up above the latter, although hollow walls may be arranged only along the sides of a fire-box, and the heater has the usual fire-box and cleanout doors. In connection with boilers of this type it is customary to mount a tubular shell such as indicated at 8 over the combustion chamber and this usually contains a number of flues through which the gaseous products of combustion are circulated in their passage to the smoke stack. This shell is connected by suitable couplings 9, or in other convenient manner, with the water spaces 7 so that the water may readily circulate through the water spaces 7 of the fire-box casing and the water space in the shell 8.

In view of the arrangement of the flues in the shell 8 and the limited space therein, it has been very difficult to install in such shell additional water heating apparatus for heating a separate supply of water. With my invention, however, I am able by the use of standard parts and fittings to provide an arrangement for heating an ample additional supply of water by circulation through the boiler, the installation being effected very easily without changing the efficiency of the boiler for heating the main supply of water. To this end I install a plurality of tubes, in superposed relation, in the water space 7 at one or both sides of the boiler, eight tubes being shown in each side of the boiler in the present embodiment, and the water is circulated through these tubes. The tubes at the right in Fig. 1 are arranged in two series, the four tubes indicated at 10 composing the upper series and the four tubes indicated at 11 composing the lower series. The forward ends of the tubes 10 are connected to a single outlet chamber in an upright header 12 while the corresponding ends of the lower pipes 11 are connected to a single outlet chamber in a similar upright header 13. These headers may be of any construction, but are shown herein as composed of nipples, 14, T-couplings 15, and end L's 16. The headers are preferably set somewhat laterally from the pipes 10 and 11 and are connected therewith through L's 17 and nipples 18.

The rear ends of the tubes 10 and 11 are not connected to headers, but each tube of the lower series is independently connected to a tube of the upper series by a suitable pipe connection 19 each of which includes a union 20 to facilitate assembling. In order to equalize the heating of the water in each connected pair of tubes, the upper tube 10 of the upper series is connected with the lower tube 11 of the lower series and the next to the highest tube 10 connected to the next to the lowest tube 11, then the next upper tube 10 is connected to the next tube 11 and the lowermost tube 10 of the upper series is connected to the uppermost tube 11 of the lower series. With this arrangement, each connected pair of pipes 10 and 11 and the connecting piping 19 forms a substantially U-shaped heater element and these elements are arranged in substantially a nested manner.

This arrangement not only simplifies the connecting of the pipes 10 and 11 and avoids interference between the pipe connections 19, but inasmuch as the water in the heating space 7 is hotter at the top than it is at the bottom, the water passing through the lowest pipe 11 and subjected to the coolest water in the space 7 returns through the top pipe 10 and is subjected to the hottest water in the space 7, and the other pipes are accordingly arranged so that the heating effect on each connected pair of pipes 10 and 11 is substantially the same.

The tubes 10 and 11 are preferably made of a non-corrosive material, the heat conductivity of which is relatively high, for example, copper, and are mounted in the boiler in a manner to prevent leakage of water from the boiler around the pipes. To this end the openings 21, which are drilled or otherwise provided in the walls of the boiler for the tubes, are provided with external tubular nipples 22 extending therearound and having a packing gland mounted thereon. These nipples may be readily attached by welding short pieces of tubing onto the wall of the boiler around the opening 21 as indicated at 23, and these nipples are externally threaded to accommodate a packing gland or ring 24 whereby a quantity of packing material 25 is compressed around the tube. Thus the joint between the tubes and the wall of the heater is effectively sealed and the pipe, at the same time, clamped securely in place while still allowing for expansion and contraction.

This heating apparatus is particularly useful for heating water for a hot water supply system and when so used I may provide a storage tank 26 which is supplied with cold water through a pipe 27, leading through a valve 28 from a source of supply, and terminating a short distance above the bottom of the tank. The tank 26 is connected to the lower end of the header 13 by suitable piping, comprising, in the illustrated embodiment, the upright pipe 29, fitting 30, pipe 31, fitting 32, pipe 33, L 34, pipe 35, L 36, pipes 37—37 and valve 38, the header 13 being provided near the lower end with a T-coupling 39 with which the pipe 37 connects.

The header 13 is preferably extended below the T-coupling 39 to afford a sediment chamber which has a removable plug at the lower end for clean out purposes, and the fittings 30 and 32 are in the form of T-fittings having removable plugs at the sides thereof remote from the pipe 31. A pipe 29ᵃ extends downwardly from the fitting 30, in line with the pipe 29 to form a sediment chamber and has a fitting at the lower end with a bottom opening, closed by a removable plug, and a side opening leading to a shut off valve 40. The pipe 29 preferably extends through the bottom of the tank 26 and terminates a short distance thereabove, as shown in Fig. 1.

The header 12 communicates with the tank 26 through suitable piping, which in the present case includes a pipe 42, leading from the upper end of the header 12, fitting 43, pipe 44, coupling 45, pipe 46, fitting 47 and pipe 48, the latter being connected to the top of the tank 26.

The hot water circulating consumption system includes a pipe 49 extending to the various places at which the water is used, faucets 50 being provided to draw off the water where desired, and the upper end of said pipe 49 is connected to a return pipe 51 which leads into the upper end of a pipe 52 which extends upwardly from the fitting 32 in line with the pipe 33. The lower end of the pipe 49 is connected by a plurality of pipes 53 with the pipe 54 which extends through the fitting 47 and pipe 48, into the storage tank 26, the lower end of said pipe 54 being a substantial distance below the level at which the pipe 48 discharges into the tank. A recording thermometer 55 may be connected in the hot water consumption system if desired. A check valve 56 is preferably provided in the return pipe 51 to prevent reverse flow of water upwardly in the pipe 51. A cold water supply pipe 57 ordinarily extends alongside the pipe 49 but as this pipe forms no part of the apparatus its various connections and outlets have not been illustrated.

In the operation of this heating apparatus the cold water in the tank 26 flows to the header 13 where it is distributed to the tubes 11, and return tubes 10, in both of which it is heated by the water in the space 7, and the heated water is collected from the tubes 10 into the header 12 and returned by gravity circulation to the upper portion of the tank 26. There is also a continuous circulation of hot water through the circulatory consumption system comprising the pipes 49 and 51. Since the return pipe 51 is connected to the pipe 33 leading to the heater tubes, adequate circulation in the pipes 49 and 51 is assured so that hot water is maintained at the faucets 50.

It will be noted that the pipe 54 is provided with a small port 54ª which is so located that communication is established between said pipe and the upper portion of the chamber in the fitting 47. This arrangement prevents a column of air being trapped in the pipe 48, fitting 47 and pipes 44 and 46, since in drawing water from the pipe 49, any air present in the pipe 48, fitting 47 or pipes 44 and 46 will be drawn through the port 54ª, thus insuring free circulation of the water through the pipes 44, 46 and 48.

Pipes 10 and 11 may be similarly arranged in the water space 7 at each side of the combustion chamber of the boiler, with corresponding upper headers as indicated at 12 and 12ª and corresponding lower headers as indicated at 13 and 13ª, and the upper ends of both headers 12 and 12ª may be connected to the pipe 44, and the lower ends of the headers 13 and 13ª connected to the pipe 33 so that the water for the hot water circulating system is heated in the tubes at both sides of the boiler. However, as the tubes at the one side of the boiler will, in most cases, be sufficient to take care of the hot water requirements, the tubes at one side of the boiler may be utilized to heat water for other purposes, as for example, for an extra radiator 58, which may be in a remote place such as a garage, vestibule or the like. In such case the header 12ª of the upper series of pipes is connected by piping 59 to the inlet valve of the radiator and the outlet from the radiator is connected by piping 60 to the lower end of the header 13ª of the lower series of tubes, the supply of water being maintained in the radiator tubes and pipe connections in the usual manner. It is to be understood, of course, that, if desired, the tubes at both sides of the boiler may be connected to an auxiliary heating system such as exemplified by the radiator 58.

I do not intend to limit my invention to the details of construction shown and described, except only in so far as certain of the appended claims are specifically so limited, as it will be obvious that modifications may be made without departing from the principles of my invention.

I claim:

1. In a water heating apparatus, the combination of a receptacle for water having one side portion in the form of a water leg with a combustion chamber adjacent thereto, two headers at one end of the receptacle, two sets of pipes extending through said water leg all arranged in substantially the same vertical plane with their end portions projecting at both ends of the receptacle, one of said sets of pipes being connected with a single inlet chamber in one of said headers and the other set connected with a single outlet chamber in the other header, and means at the opposite end of the receptacle for connecting the pipes of one set in nested pairs with the pipes of the other set whereby a flow of water is induced through the several pairs of pipes from one header to the other with the temperature of the water in one pair conforming substantially to the temperature of the water in each of the other pairs.

2. In a water heating apparatus, the combination of a horizontally narrow receptacle for water, means for heating the water in said receptacle, a plurality of pipes extending through the narrow water space in said receptacle with their end portions projecting at both ends of the receptacle, said pipes being arranged substantially in a vertical plane at successively higher levels, a header at one end of the receptacle having a single chamber connected with one set of the pipes, a second header at the same end of the receptacle having a single chamber connected with the remaining pipes, and means at the opposite end of the receptacle connecting the pipes of one set with the pipes of the other set in nested pairs whereby a plurality of streams of water are caused to flow from one header to the other, with the temperature of the water in the several pairs substantially the same as delivered to the upper header.

3. In a water heating apparatus, the combination of a receptacle for water having its side portions in the form of water legs in spaced relation with a combustion chamber therebetween, two sets of pipes extending through the water leg portion at each side of said receptacle with their end portions projecting at both ends of the receptacle, means at one end of the receptacle for connecting together the ends of the pipes of one set at each side of the receptacle, means at the same end of the receptacle for connecting together the ends of the pipes of the other set at each side of the receptacle, and means at each side at the opposite end of the receptacle for connecting the pipes of one set in pairs in the form of U-shaped elements with the pipes of the other set, the several U-shaped elements being nested with each other with all of said pipes at each side of the receptacle arranged in substantially the same vertical plane.

4. In a water heating apparatus, the combination of a receptacle adapted to contain water, means for heating the water in said receptacle, a plurality of pipes extending through said receptacle with their end portions projecting at both ends of the receptacle, said pipes being arranged in a vertical plane at successively higher levels, an equal number of return pipes extending through said receptacle above said first-named pipes in the same vertical plane and also having their end portions projecting at both ends of the receptacle, a header at one end of the receptacle having a single chamber connected with said first-named pipes, a second header at the same end of the receptacle having a single chamber connected with the return pipes, and means at the opposite end of the receptacle connecting the first-named pipes with the return pipes respectively in nested pairs in U-form for causing a plurality of streams of water to flow from one of the headers through the receptacle and back through the receptacle to the other header, whereby the water delivered to the upper header by one return pipe is of substantially the same temperature as that delivered by each of the other return pipes to said upper header.

ROBERT W. MARTIN.